United States Patent [19]
Barclay et al.

[11] Patent Number: 4,553,566
[45] Date of Patent: Nov. 19, 1985

[54] ROTARY MULTIPOSITION VALVE
[75] Inventors: John A. Barclay; Jack E. Dyson, both of Los Alamos, N. Mex.
[73] Assignee: The United States of America as represented by the United States Department of Energy, Washington, D.C.
[21] Appl. No.: 597,802
[22] Filed: Apr. 6, 1984
[51] Int. Cl.⁴ ............................................. F16K 11/07
[52] U.S. Cl. .......................... 137/625.11; 137/625.15; 137/625.29; 137/625.46
[58] Field of Search ...................... 137/625.29, 625.46, 137/625.11, 625.12, 625.13, 625.14, 625.15, 625.16, 625.21, 625.22, 625.23, 625.24, 625.47, 625.31, 625.32

[56] References Cited
U.S. PATENT DOCUMENTS
1,465,569  8/1923  Taylor ............................ 137/625.24
2,447,423  8/1948  Nies ................................ 137/625.11
4,312,372  1/1982  Amos et al. .................... 137/625.47

Primary Examiner—Martin P. Schwadron
Assistant Examiner—John S. Starsiak, Jr.
Attorney, Agent, or Firm—Lee W. Huffman; Paul D. Gaetjens; Judson R. Hightower

[57] ABSTRACT

The disclosure is directed to a rotary multiposition valve for selectively directing the flow of a fluid through a plurality of paths. The valve comprises an inner member and a hollow housing with a row of ducts on its outer surface. The ducts are in fluid communication with the housing. An engaging section of the inner member is received in the housing. A seal divides the engaging section into a hollow inlet segment and a hollow outlet segment. A plurality of inlet apertures are disposed in the inlet segment and a plurality of outlet apertures are disposed in the outlet segment. The inlet apertures are disposed in a longitudinally and radially spaced-apart pattern that can be a helix. The outlet apertures are disposed in a corresponding pattern. As the inner member is rotated, whenever an inlet aperture overlaps one of the ducts, the corresponding outlet aperture overlaps a different duct, thus forming a fluid pathway.

12 Claims, 12 Drawing Figures

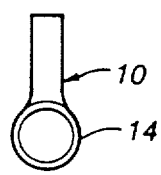
Fig. 5
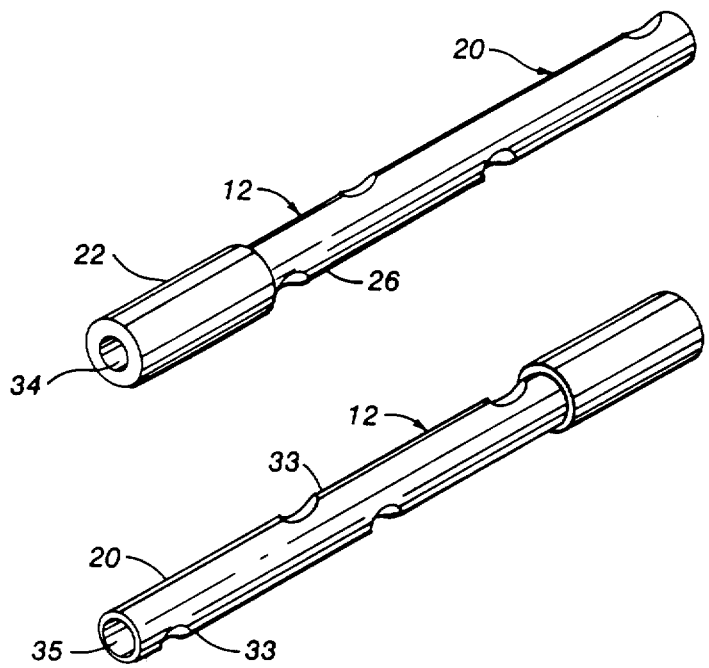
Fig. 6
Fig. 7
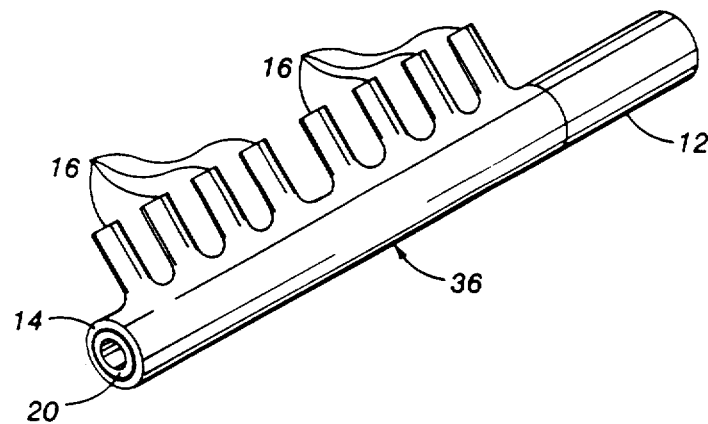
Fig. 8

ROTARY MULTIPOSITION VALVE

This invention is the result of a contract with the Department of Energy (Contract No. W-7405-ENG-36).

BACKGROUND OF THE INVENTION

The invention described herein relates generally to rotary valves and more particularly to multiposition rotary valves useful at cryogenic temperatures.

Rotary valves are well known. They have been used for years in hydraulic systems and to control the delivery of fluids to various engine components. In systems where several steps are performed, a separate valve has been used to control the movement of the fluid at each step. Since valve maintenance is a significant problem in many applications, it is highly desirable to reduce the number of valves needed.

SUMMARY OF THE INVENTION

One object of the present invention is to provide a rotary multiposition valve for selectively directing the flow of a fluid through a plurality of paths.

Another object of the invention is to replace several valves with a single valve.

To achieve the foregoing and other objects, and in accordance with the purposes of the present invention, as embodied and broadly described herein, there is provided an apparatus for selectively directing the flow of a fluid through a plurality of paths. The apparatus comprises an inner member and a housing that includes a hollow tube. A plurality of ducts are spaced apart in a longitudinal row on the outside surface of the housing. The ducts are in fluid communication with the hollow tube. The inner member has an engaging section and a base section. The engaging section is received in the hollow tube and the base section is located outside of the hollow tube. A seal divides the engaging section into a hollow inlet segment and a hollow outlet segment. The seal can be centrally disposed within the engaging section. The base section has a hollow interior segment in fluid communication with the inlet segment. A plurality of inlet apertures is disposed in a longitudinally and radially spaced-apart pattern in the inlet segment. A plurality of outlet apertures is disposed in a corresponding spaced-apart pattern in the outlet segment. The patterns formed by the apertures can be helixes. There can be four apertures in the inlet segment and four in the outlet segment. There can be eight ducts. The housing and the inner member can be made of the same metal, such as stainless steel. The engaging section can have relief grooves between the apertures. The hollow tube can have a diameter from about $4 \times 10^{-4}$ mm to about $1 \times 10^{-3}$ mm larger than the outside diameter of the engaging section. The fluid can be helium gas.

One advantage of the present invention is that a plurality of valves can be replaced with a single valve.

Another advantage of the invention is that a rotary multiposition valve can selectively direct the flow of a fluid through a plurality of paths.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 5 shows an end view of the housing.

FIG. 6 shows a perspective view of the inner member.

FIG. 7 shows another perspective view of the inner member.

FIG. 8 shows a perspective view of the housing with the engaging section of the inner member inside the housing.

DETAILED DESCRIPTION OF THE INVENTION

Figure 1:
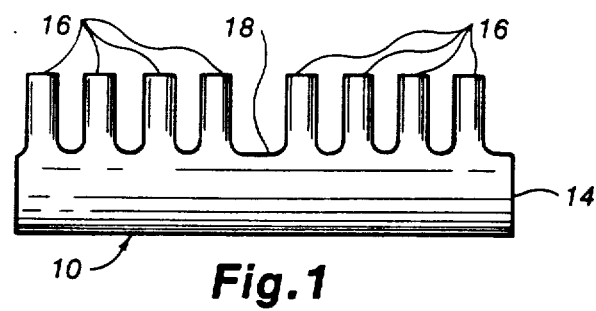
FIG. 1 shows a side view of the housing.

Reference is now made to FIG. 1 which shows a side view of a housing 10 in accordance with the present invention. The present invention is a rotary multiposition valve that selectively directs the flow of a fluid through a plurality of paths. The valve comprises a housing 10 and an inner member 12, as is shown in FIG. 3.

Referring again to FIG. 1, the housing 10 includes a hollow tube 14. A plurality of ducts 16 is disposed on the periphery 18 of the housing 10. The ducts 16 are arranged longitudinally in a single orientation in a spaced-apart relationship.

Figure 2:
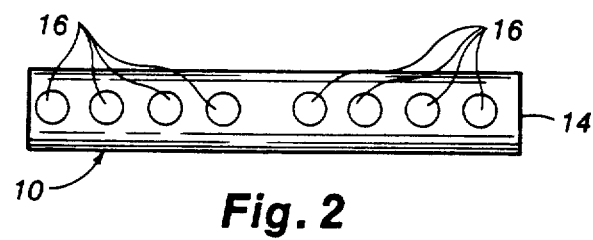
FIG. 2 shows a plan view of the housing.

FIG. 2 shows a plan view of housing 10. Seen from above, it is apparent that the ducts 16 are in fluid communication with hollow tube 14.

Figure 3:
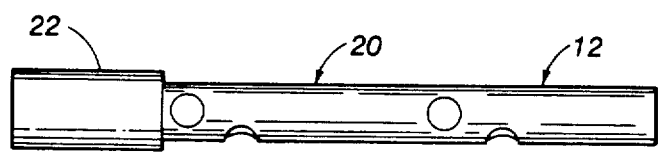
FIG. 3 shows a side view of the inner member of the valve separate from the housing.

FIG. 3 shows a side view of inner member 12. Inner member 12 has an engaging section 20 and a base section 22. The engaging section 20 is adapted to be received within hollow tube 14. The base section 22 remains outside of hollow tube 14 when engaging section 20 is inserted in hollow tube 14 of housing 10.

Figure 4:
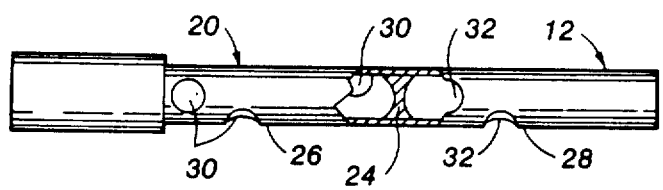
FIG. 4 shows a partial fragmentary side view of the inner member.

FIG. 4 shows a partial fragmentary side view of inner member 12. Engaging section 20 includes a seal means 24 that divides engaging section 20 into a hollow inlet segment 26 and a hollow outlet segment 28. Seal means 24 can be centrally disposed within engaging section 20. Hollow inlet segment 26 includes a plurality of inlet apertures 30, three of which are shown in FIG. 4. Hollow outlet segment 28 includes a plurality of outlet apertures 32, two of which are visible in FIG. 4. The plurality of inlet apertures 30 is disposed in a longitudinally and radially spaced-apart pattern in inlet segment 26. The plurality of outlet apertures 32 is disposed in a corresponding spaced-apart pattern in outlet segment 28.

FIG. 5 shows an end view of housing 10. Hollow tube 14 is clearly shown. Preferably, the inside diameter of hollow tube 14 is from about $4 \times 10^{-4}$ mm to about $1 \times 10^{-3}$ mm larger than the outside diameter of engaging section 20, shown in FIGS. 6 and 7. This tight fit helps prevent leakage.

FIGS. 6 and 7 show perspective views of inner member 12. In FIG. 6 base section 22 includes a hollow interior segment 34, which is in fluid communication with hollow inlet segment 26. Fluid is introduced into inner member 12 at hollow interior segment 34. In FIG. 7, engaging section 20 includes an exit orifice 35, through which fluid leaves inner member 12. Preferably, there are relief grooves 33 between the apertures. They can be about 0.005 cm deep and can be as wide as the apertures. They help prevent valve freeze-up due to galling.

FIG. 8 shows a perspective view of a valve 36 in accordance with the invention. Engaging section 20 of inner member 12 is shown inside hollow tube 14. In this preferred embodiment of the invention, there are eight ducts 16 and there are four inlet apertures (not shown) and four outlet apertures (not shown). The inlet and outlet apertures are preferably disposed in identical helical patterns. The housing 10 and inner member 12 are preferably made of the same metal, such as stainless steel. Using the same metal avoids problems of different rates of expansion and contraction when fluids of varying temperatures are passed through the valve 36. They can be made of different metals if the thermal expansion coefficients of the two metals are close. One fluid that can be used is helium gas.

Figure 9:
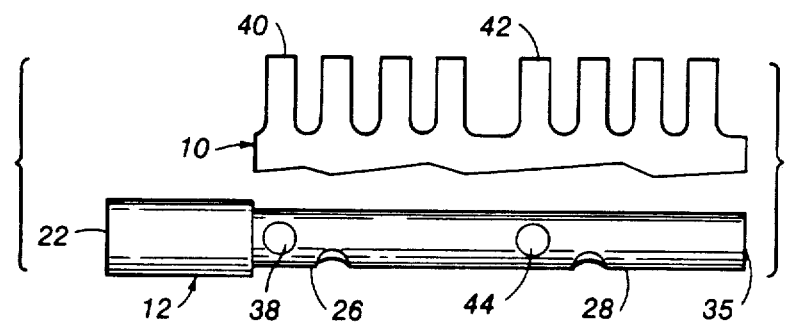
FIG. 9 shows a side view of the inner member with a schematic representation of the location of the housing ducts.

FIG. 9 shows a side view of inner member 12 with a partial schematic representation of housing 10 displaced above inner member 12. Although only two can be seen, in this preferred embodiment there are four inlet apertures 38 and four outlet apertures 44. Inlet aperture 38 is, for purposes of illustration, considered to be overlapping with duct 40. Fluid which enters base section 22 will leave hollow inlet segment 26 via inlet aperture 38 and pass through duct 40. If duct 40 is in fluid communication with return duct 42, (the device making this connection is not shown) then the fluid will enter hollow outlet segment 28 via outlet aperture 44 and leave inner member 12 via exit orifice 35.

Figure 10:
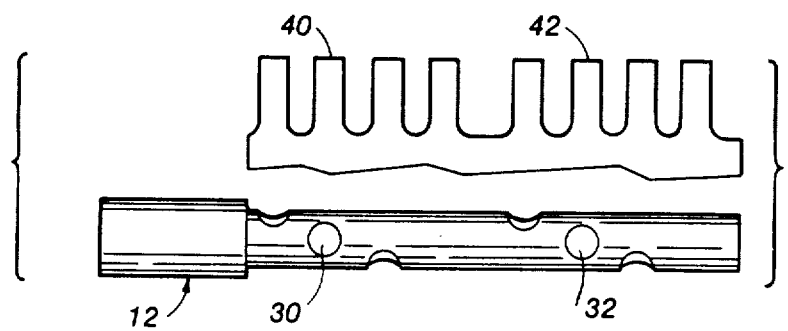
FIGS. 10, 11 and 12 show side views of the inner member, rotated to bring the next aperture into view, with a schematic representation of the location of the housing ducts.
Figure 11:
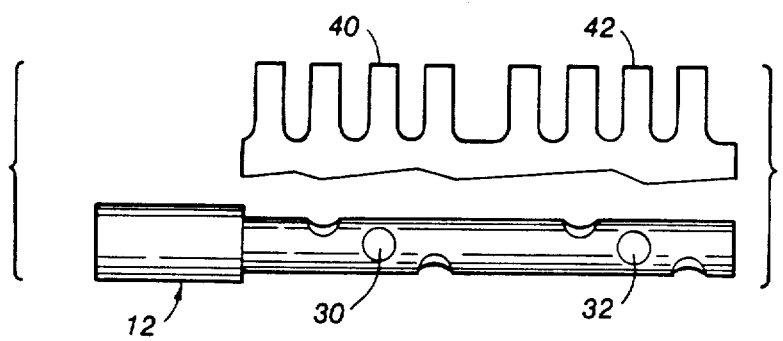
Figure 12:
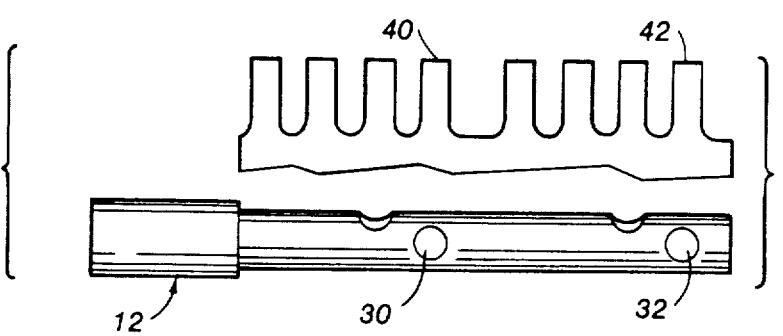

In FIGS. 10, 11 and 12 inner member 12 has been rotated to bring different inlet apertures 30 into alignment with duct 40 and different outlet apertures 32 into alignment with return duct 42.

The present invention can be used in a wide variety of applications. The valve can be used to deliver the same or different fluids at different temperatures by heating or cooling the fluids between different pairs of ducts. It can be used to control the flow of fluids and to dispense fluids.

The foregoing description of the preferred embodiment of the invention has been presented for purposes of illustration and description. It is not intended to be exhaustive or to limit the invention to the precise form disclosed. It was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A rotary multiposition valve for selectively directing the flow of a fluid through a plurality of paths comprising:
   a. a housing, said housing having a portion defining a hollow tube;
   b. a plurality of ducts, said ducts being disposed longitudinally in a spaced-apart relationship on the periphery of said housing and being in fluid communication with said hollow tube; and
   c. an inner member having an engaging section and a base section connected thereto, said engaging section being received in said hollow tube and having a seal means disposed within and dividing said engaging section into a hollow inlet segment and a hollow outlet segment, said base section being outside of said hollow tube and having a hollow interior segment in fluid communication with said inlet segment, said inlet segment having portions defining a plurality of inlet apertures, said plurality of inlet apertures being disposed in a longitudinally and radially spaced-apart pattern in said inlet segment, said outlet segment having portions defining a plurality of outlet apertures, said plurality of outlet apertures being disposed in a corresponding spaced-apart pattern in said outlet segment, so that as said inner member is rotated relative to said housing, whenever an inlet aperture overlaps with one of said ducts, the corresponding outlet aperture will overlap with a different duct, whereby a fluid pathway is formed through which fluid introduced into said base section can flow when the corresponding ducts are connected.

2. The invention of claim 1 wherein the pattern formed by said first plurality of apertures comprises a helix.

3. The invention of claim 2 wherein the pattern formed by said second plurality of apertures comprises a helix.

4. The invention of claim 1 wherein said seal means is centrally disposed within said engaging section.

5. The invention of claim 1 wherein said plurality of inlet apertures comprises four inlet apertures.

6. The invention of claim 5 wherein said plurality of outlet apertures comprises four outlet apertures.

7. The invention of claim 6 wherein said plurality of ducts comprises eight ducts.

8. The invention of claim 1 wherein said housing and said inner member comprise a metal.

9. The invention of claim 8 wherein said housing and said inner member comprise the same metal.

10. The invention of claim 9 wherein said housing and said inner member comprise stainless steel.

11. The invention of claim 1 wherein said hollow tube has a diameter from about $4 \times 10^{-4}$ mm to about $1 \times 10^{-3}$ mm larger than the outside diameter of said engaging section.

12. The invention of claim 1 wherein said fluid comprises helium gas.

* * * * *